C. C. ANDREWS.
APPARATUS FOR DESTROYING VERMIN.
APPLICATION FILED APR. 16, 1913.
1,113,180.
Patented Oct. 13, 1914.
3 SHEETS—SHEET 1.
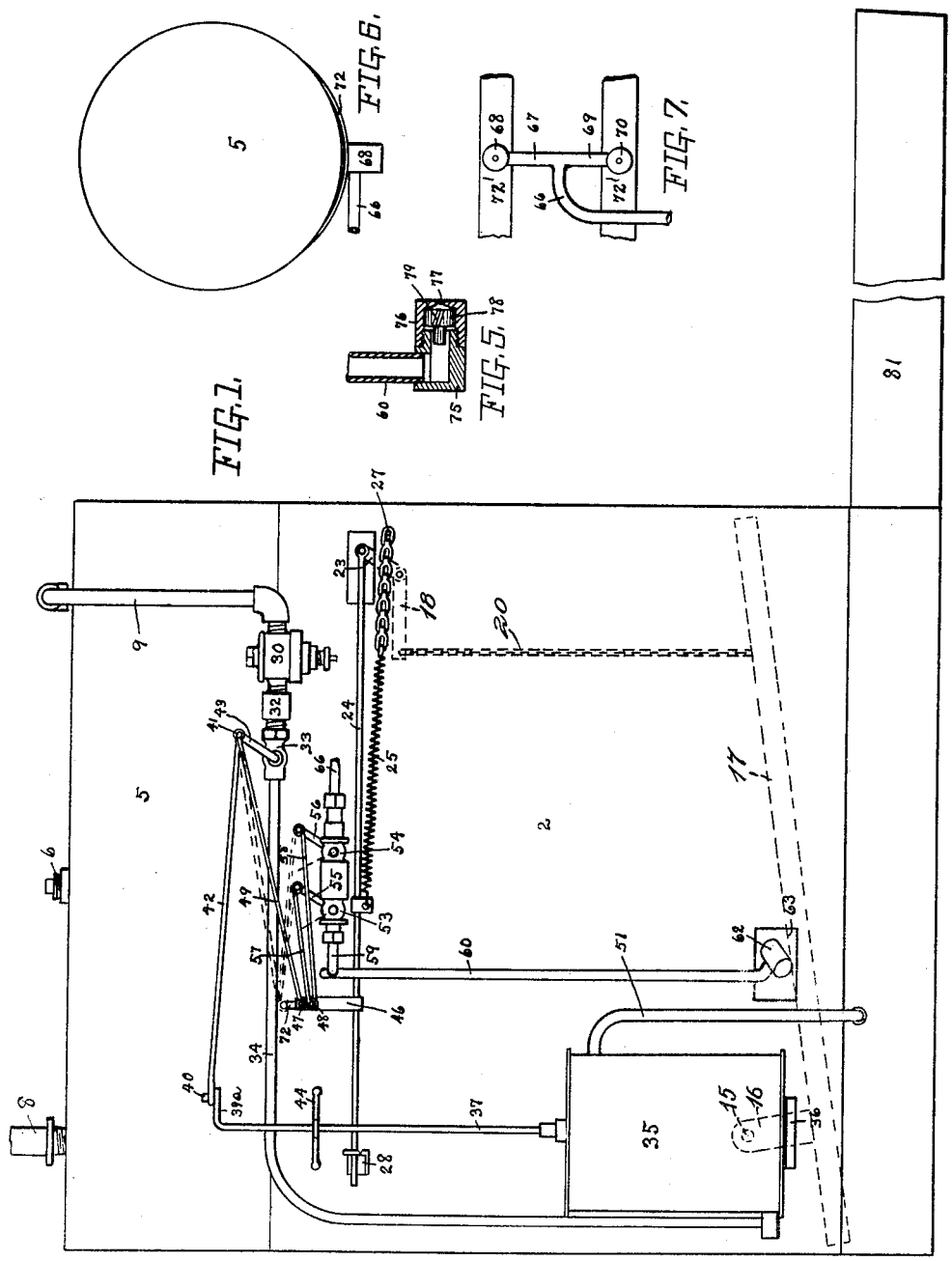
WITNESSES:
Hugo W. Freinbring
Mary A. Hawthorne.
INVENTOR
Collin C. Andrews
BY
Edward N. Pagelsen.
ATTORNEY

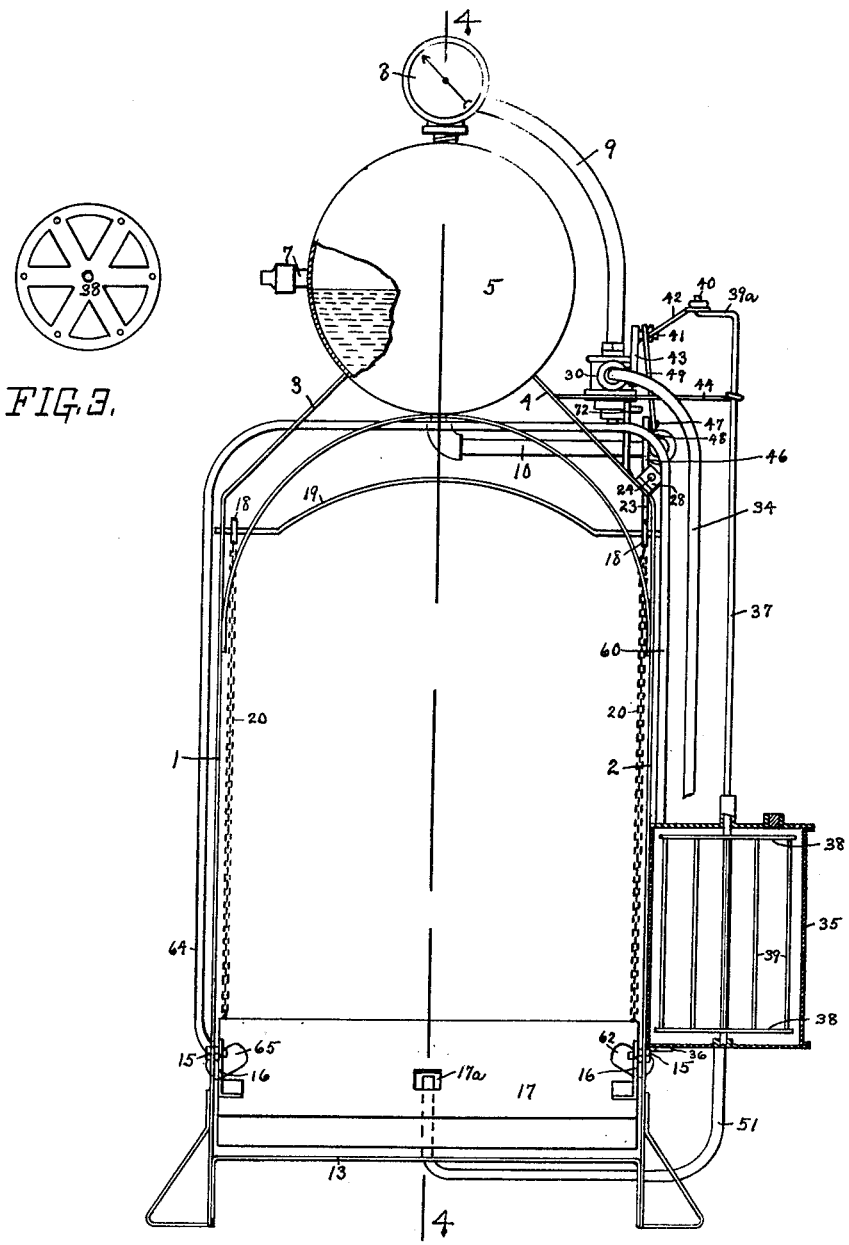

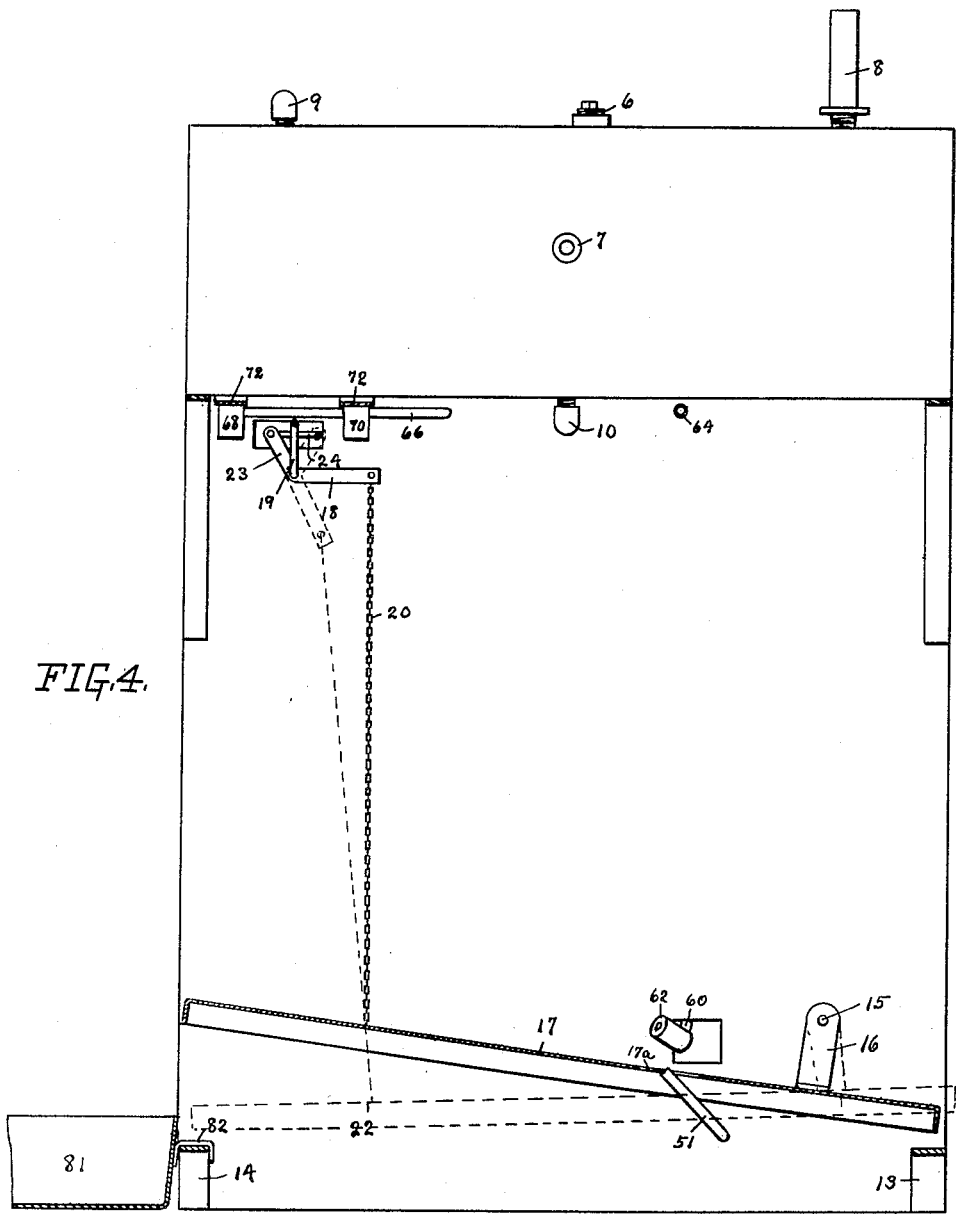

UNITED STATES PATENT OFFICE.

COLLIN C. ANDREWS, OF AUBURN, INDIANA.

APPARATUS FOR DESTROYING VERMIN.

1,113,180.  Specification of Letters Patent.  Patented Oct. 13, 1914.

Application filed April 16, 1913. Serial No. 761,430.

*To all whom it may concern:*

Be it known that I, COLLIN C. ANDREWS, a citizen of the United States, and a resident of Auburn, in the county of Dekalb and State of Indiana, have invented a new and Improved Apparatus for Destroying Vermin, of which the following is a specification.

This invention relates to means for destroying vermin, such as lice, fleas and mites, which infest poultry, and for causing such vermin as are not destroyed to drop from the birds; and the object of this invention is to provide a device which will project powders and vapors against those portions of the birds which are most liable to be infested, and to provide automatic means whereby the bird itself shall control the operation of the vermin destroying apparatus.

This invention consists of an open-ended shell through which the bird must pass and a pivoted platform on which the bird must walk, together with a reservoir or container for compressed air and a vermin destroying liquid, pipes leading therefrom in such a manner that fine sprays of the liquid will be directed against the abdomen and sides of the birds, and, if desired, against the back of their necks.

It further consists in mounting a powder receptacle adjacent the shell and connecting pipes to the same, one of the pipes extending to the air container, and the other extending into the shell in such a manner that when the platform is depressed, a puff of powder will be projected against the abdomen of the bird.

It further consists in providing valves for controlling the flow of liquid and compressed air, in providing means for keeping the powder in the receptacle agitated, and in providing means for returning the platform and other mechanism to normal position.

In the accompanying drawings Figure 1 is a side elevation of this improved vermin destroyer. Fig. 2 is a front elevation of the same. Fig. 3 is a detail of the agitator. Fig. 4 is a section on the line 4—4 of Fig. 2. Figs. 5, 6 and 7 are details of construction of the upper spraying devices.

Similar reference characters refer to like parts throughout the several views.

As will be seen from the drawings, the shell is formed of upright sides 1 and 2 having their upper ends 3 and 4 inclined and engaging the cylindrical container 5. This container is intended to be partly filled with a disinfecting and vermin destroying liquid such as crude carbolic acid, which may be introduced upon removing the plug 6 in the top of the receptacle. As this apparatus is intended to operate with the liquid and with compressed air, a connection 7 is provided whereto an air-pump may be attached for compressing air within the container, a gage 8 being provided to indicate the pressure. A pipe 9 connects to the top of the container and through it compressed air will flow therefrom, while a pipe 10 connects to the bottom of the container.

The lower edges of the sides 1 and 2 are held spaced by braces 13 and 14. Mounted on pins 15 extending through the sides of the shell are the brackets 16 which extend upwardly from the platform 17. This platform connects to the arms 18 on the shaft 19 by means of the chains 20, in such a manner that when a bird walks through the shell, from right to left in Fig. 4, the platform will be depressed to the position shown in dotted line 22. On this shaft 19 is a lever arm 23, shown in Figs. 1 and 4, and to this lever arm connects the operating rod 24. The normal position of this operating rod is shown in Fig. 1 and the rod is held in that position by means of a spring 25 which connects to the rod 24 and to a chain 26 which has links of such size that they will pass over the pin 27, whereby the tension of the spring may be regulated. The opposite end of this rod 24 passes through a hole in the bracket 28 mounted on the side 2 of the shell.

On the lower end of the pipe 9 is mounted a reducing valve 30 of any desired construction, so that the air flowing into the connection 32 will always be of substantially the same pressure. A valve 33 connects to this coupling 32 and to a pipe 34, which pipe connects to the powder receptacle 35 at its lower end. This receptacle is mounted on a small bracket 36 on the side 2 of the shell, and has an agitator shaft 37 which carries spiders 38 and rods 39, as shown in Figs. 2 and 3. The upper end of the shaft 37 is formed into a crank 39ᵃ having a pin 40. A link 42 connects to this pin 40 and to a pin 41 at the outer end of the crank 43, which opens and closes the valve 33. A brace 44 on the side 2 supports the upper end of this agitator rod 37. Secured to the operating rod 24 is an upright plate 46 having pins 47 and 48. A link 49 connects the pin 47 to the pin 41 on the crank 43. When therefore a bird depresses the platform 17 to the line 22, the shaft 19 is turned and the arm 23 will move the operating rod 24 to the left in Fig. 1, and thereby move the link 49 to the left and swing the valve arm 43 in that direction, thereby opening the valve and permitting a blast of air to pass down through the pipe 9, the reducing valve 30, the valve 33 and the pipe 34 into the receptacle 35. From this receptacle a pipe 51 extends downward and inward through the wall 2 beneath the platform, as shown in Figs. 2 and 4, with its end normally in an opening 17ª at the surface of the platform 17. When a bird passes in from the right in Fig. 4 across this platform and depresses it, the tension of the spring 25 is such that the platform will reach the position shown in dotted line 22 just as the abdomen of the bird is in the line of the discharge end of the pipe 51. The result will be that a small portion of powder will be blown with considerable force against the abdomen of the bird, and, as it impinges from the rear, the powder will have no difficulty in penetrating to the skin and thoroughly covering not only the skin of the abdomen but also the feathers themselves, and thus also the lice and fleas with which the bird may be infested. Powders which are fatal to vermin and harmless to poultry may easily be obtained. When the bird steps off the platform, the spring 25 will cause the parts to resume their normal position and close the valve 33.

In order to reach the sides of the bird, and also the top of the head and back of the neck, which seem to be particularly susceptible and which are more often infested than other parts of the bird, the following described apparatus is provided for directing a very fine spray of disinfectant against these parts. To the outer end of the pipe 10 the valves 53 and 54 are connected, which valves are controlled by the arms 55 and 56. Rods 57 and 58 connect these arms 55 and 56 to the pin 48 on the plate 46. A pipe 59 connects to the valve 53 and forks, one branch 60 extending down outside of the shell as shown in Fig. 1, and having a nozzle 62 at its lower end which is directly inwardly and upwardly through an opening 63, while the other branch 64 has a similar nozzle 65.

The pipe 66 extends from the valve 54 into the upper part of the shell as shown in Fig. 4, and in turn it also branches as shown in Fig. 7, one branch 67 connecting to the nozzle 68 and the other branch 69 connecting to the nozzle 70. These nozzles are supported by plates 72', as shown in Figs. 4 and 6, from the container 5 and both nozzles discharge immediately downward. When the parts are all connected into operative relation with the platform, sprays of liquid will be forced down from the two nozzles 68 and 70 onto the neck and the top of the back of the bird, while the nozzles 62 and 65 will direct similar sprays upward against the sides. These valves 53 and 54 will also close immediately upon the bird leaving the platform. If birds of small size are to be treated, the tension of the spring 25 will be much less than when heavy birds are to pass through this apparatus. It is desirable that the platform shall move down to the position indicated by line 22 when the bird is in such position that the nozzles will direct sprays in the proper direction and toward the proper portions of the bird.

In case it is desired to use one or the other of the sprays alone, the small bracket 72 is provided having a pin to receive the ends of the links 49, 57 and 58 when they are removed from the pins 47 or 48. These new positions of the links are shown in dotted lines in Fig. 1 and when in these positions, the links will hold their respective valves closed and only those valves will be opened whose links remain connected to the plate 46 on the rod 24.

While any desired type of spray nozzle may be employed, that shown in Fig. 5 is preferred. It consists of a body 75 to which the pipe 60 may be connected by soldering. A cap 76 has a discharge opening 77 and within the cap is a cylinder 78 having a plurality of diagonal creases or grooves 79 which are so small that but a very minute stream of liquid may pass through. The effect of this nozzle is to cause the spray to be of very small particles of liquid, so that a considerable surface is covered thereby.

The feet of poultry are attacked by mites, which are usually most troublesome at night. To rid the fowl of these pests, a pan 81 may be placed at an exit end of the shell, hooks 82 being provided to engage over the brace 14 to hold the pan in position. A small quantity of kerosene is placed in the pan, and as the fowls step into the liquid, the mites on the feet will be killed. Furthermore, the fowl will carry sufficient kerosene onto the roosts to destroy all mites thereon.

Many changes in the details of construction and proportions of the parts may be made by those skilled in the art without departing from the spirit of my invention as expressed in the claims.

I claim.

1. In an apparatus for destroying vermin, the combination of an open-ended shell, a container for compressed air supported thereby, a powder-receptacle mounted on the frame, a pipe leading from the container to the powder receptacle, a valve in said pipe, a platform pivotally mounted within the shell, a pipe extending from the powder receptacle below the platform and up through the same, and connections between the platform and the valve whereby the valve will be opened to permit a flow of air from the container through the powder receptacle and upward from the platform when the platform is depressed.

2. In an apparatus for destroying vermin, the combination of an open-ended shell, a container for compressed air supported thereby, a powder-receptacle mounted on the frame, a pipe leading from the container to the powder receptacle, a valve in said pipe, a platform pivotally mounted within the shell, a pipe extending from the powder receptacle below the platform and up through the same, connections between the platform and the valve whereby the valve will be opened to permit a flow of air from the container through the powder receptacle and upward from the platform when the platform is depressed, and means operated by said platform to agitate the contents of the powder receptacle.

3. In an apparatus for destroying vermin, the combination of an open-ended shell, a container for compressed air supported thereby, a powder-receptacle mounted on the frame, a pipe leading from the container to the powder receptacle, a valve in said pipe, a platform pivotally mounted within the shell, a pipe extending from the powder receptacle below the platform and up through the same, connections between the platform and the valve whereby the valve will be opened to permit a flow of air from the container through the powder receptacle and upward from the platform when the platform is depressed, and means to control the pressure of the air entering the powder receptacle.

4. In an apparatus for destroying vermin, the combination of an open ended shell through which fowls may pass, a platform pivotally mounted in the shell and adapted to be depressed by a fowl walking over it, a container mounted above the shell, a pipe leading therefrom, a plurality of valves connected to said pipe, pipes extending from said valves into the shell at different points, a slidable operating rod, a pin connected thereto, links connecting to said pin and to said valves to open them when the rod is actuated, a stationary pin to receive the ends of the links and thus hold the valves closed, and means connected to said rod and said platform whereby the rod is actuated whenever the platform is depressed.

5. In an apparatus for destroying vermin, the combination of a frame, a container for compressed air, a powder receptacle, an air conduit connecting the container with the receptacle, means for normally closing the conduit, a movable platform supported in the frame, a second conduit leading from the powder receptacle to a point in the vicinity of the platform, and means operated by the platform for opening the first-mentioned conduit, thereby admitting compressed air to the powder receptacle.

6. In an apparatus for destroying vermin, the combination of a container for compressed air, a powder receptacle, an air conduit connecting the container with the receptacle, means for normally closing said conduit, a movable platform, a second conduit leading from the powder receptacle to a point in the vicinity of the platform, means operated by the platform for opening the conduit between the container and the receptacle, thereby admitting compressed air to the receptacle, and means operated by the platform for agitating the contents of the powder receptacle.

7. In an apparatus for destroying vermin, the combination of a container for compressed air, means for supplying compressed air thereto, a closed receptacle for a vermin destroying substance, an air conduit connecting the container with the receptacle, a movable platform, a second conduit leading from the receptacle to a point in proximity to the platform, and means operated by the platform for opening the first-mentioned conduit and admitting compressed air to the receptacle.

8. In an apparatus for destroying vermin, the combination of a container for compressed air, a closed powder receptacle, an air conduit connecting the container with the lower portion of the receptacle, means for normally closing the conduit, a movable platform, a second conduit leading from the upper portion of the receptacle to a point in proximity to the platform, and means operated by the movement of the platform for opening the first-mentioned conduit and admitting compressed air to the powder receptacle.

9. In an apparatus for destroying vermin, the combination of a shell, a container for compressed air, a closed powder receptacle mounted on the shell, a pipe connecting the container with the powder receptacle, a valve normally closing the opening in the pipe, a movable platform supported in the shell, a second pipe leading from the powder receptacle to a point in the vicinity of the platform, and means operated by the platform for opening the valve to admit air to the receptacle for the purpose of discharging powder therefrom.

10. In an apparatus for destroying vermin, the combination of a shell, a container for compressed air, a closed powder receptacle mounted on the shell, a pipe connecting the container with the powder receptacle, a valve normally closing the opening in the pipe, a movable platform supported in the shell, a second pipe leading from the powder receptacle to a point in the vicinity of the platform, means operated by the platform for opening the valve to admit air to the receptacle for the purpose of discharging powder therefrom, and means operated by the platform for agitating the contents of the powder receptacle.

11. In an apparatus for destroying vermin, the combination of a shell through which fowls may pass, a platform mounted in the shell and adapted to be depressed by a fowl walking over it, a container for compressed air, a pipe leading therefrom, a plurality of valves connected to said pipe, pipes leading from said valves into the shell at different points, a slidable operating rod, a plurality of links, one connected to each valve and all connected to the slidable operating rod, and means connecting the rod with the platform whereby the rod is actuated whenever the platform is depressed.

12. In an apparatus for destroying vermin, the combination of a shell through which fowls may pass, a platform mounted in the shell and adapted to be depressed by a fowl walking over it, a container mounted above the shell, a pipe leading therefrom, a plurality of valves connected to said pipe, pipes extending from said valves into the shell at different points, a slidable operating rod, a plurality of links, one connected to each valve and all connected to the slidable operating rod, and means connecting the rod with the platform whereby the rod is actuated whenever the platform is depressed.

In testimony whereof I have signed this specification in the presence of two subscribing witnesses.

COLLIN C. ANDREWS.

Witnesses:
A. W. MADDEN,
D. D. MOODY.